UNITED STATES PATENT OFFICE.

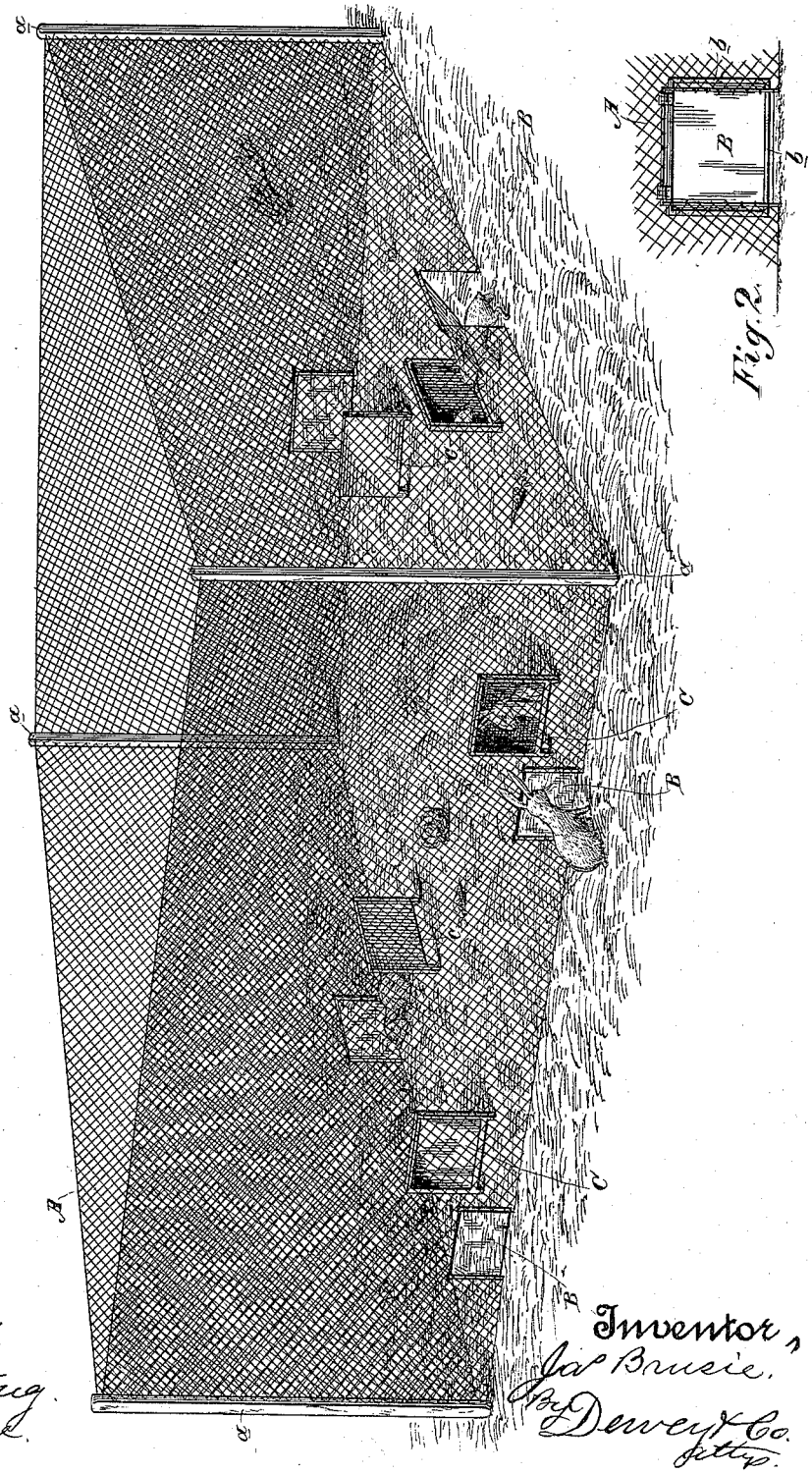

JAMES BRUSIE, OF OAKLAND, CALIFORNIA.

ANIMAL-TRAP.

SPECIFICATION forming part of Letters Patent No. 383,700, dated May 29, 1888.

Application filed February 16, 1888. Serial No. 264,231. (No model.)

*To all whom it may concern:*

Be it known that I, JAMES BRUSIE, of Oakland, Alameda county, State of California, have invented an Improvement in Animal-Traps; and I hereby declare the following to be a full, clear, and exact description of the same.

My invention relates to the class of traps for catching small animals, but more especially rabbits.

My invention consists in the improved trap hereinafter described and claimed.

The object of my invention is to provide an effective trap for rabbits, and one which is at the same time cheap in construction and readily transportable.

Referring to the accompanying drawings, Figure 1 is a perspective view of my trap. Fig. 2 is a detail view of one of the doors B.

A is the cage. It is best made by the use of the ordinary wire-netting of commerce, which is bought in rolls of different heights or widths. The netting is secured to four posts, $a$, and to make the cage rabbit-proof and prevent escape by burrowing, the ground within the inclosure should be covered with netting. All around the base of the cage, and at any desirable distance apart, I make openings which are protected by doors B. These doors are made of transparent material—such as glass—and they are suspended by a hinge above, so that they can swing; but their surrounding frames $b$ are so made as to allow them to swing inwardly only. Any suitable enticing material or food may be placed within the cage. The rabbit, endeavoring to gain admission to the cage, soon sees what he deems an unguarded opening, the door B being of glass, and therefore not noticed by him. He therefore makes for the opening, and the door, swinging inwardly, does not impede him, and under his original impulse he passes through into the cage. He cannot get out again, for the doors B do not swing outwardly.

Now, in order to better insure the entrance of the rabbit, I place within the cage and just behind each door B a mirror, C, the location being such that upon discovering and approaching the supposed opening of the door B the rabbit cannot fail to observe his image in the mirror. Surprised by this he pricks up his ears, and, his image doing likewise, he is the more impelled to enter the cage, in order to make the acquaintance of so close a companion, for though other rabbits might really be within and in sight, still the proximity and sympathetic actions of the reflected rabbit do more to create a sudden impulse toward the door B than the confined real rabbits do.

A great advantage of this trap is that it can easily be carried from place to place. The wire-netting can be rolled up, as when first bought, into small compass, and the four posts and mirrors and doors easily packed. The whole thing is, moreover, very cheap, and is therefore practical in an economical sense. It is also effective in operation.

Having thus described my invention, what I claim as new, and desire to secure by Letters Patent, is—

1. An animal-trap consisting of a collapsible inclosure of wire-netting secured to corner-posts, and having openings in all of its sides, the frames $b$, surrounding said openings, solid glass doors suspended within the openings, and mirrors inside of the inclosure and back of each door, substantially as described.

2. An improved animal-trap consisting of an inclosure made of wire-netting adapted to be rolled up when not in use, said inclosure having openings on all sides, solid glass doors suspended in said openings and adapted to swing inward, and mirrors fixed in the ground inside of the inclosure and in line with the doors, as herein described.

In witness whereof I have hereunto set my hand.

JAMES BRUSIE.

Witnesses:
S. H. NOURSE,
H. C. LEE.